(12) United States Patent
Zhang et al.

(10) Patent No.: US 10,747,675 B2
(45) Date of Patent: Aug. 18, 2020

(54) METHOD AND DEVICE FOR MANAGING CACHES

(71) Applicant: EMC IP Holding Company LLC, Hopkinton, MA (US)

(72) Inventors: Lester Zhang, Beijing (CN); Denny Dengyu Wang, Beijing (CN); Chen Gong, Beijing (CN); Geng Han, Beijing (CN); Joe Liu, Beijing (CN); Leon Zhang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/709,951

(22) Filed: Sep. 20, 2017

(65) Prior Publication Data

US 2018/0089092 A1    Mar. 29, 2018

(30) Foreign Application Priority Data

Sep. 23, 2016   (CN) .......................... 2016 1 0848648

(51) Int. Cl.
| | |
|---|---|
| G06F 12/08 | (2016.01) |
| G06F 12/0888 | (2016.01) |
| G06F 16/11 | (2019.01) |
| G06F 16/172 | (2019.01) |
| G06F 12/0886 | (2016.01) |
| G06F 12/0866 | (2016.01) |
| G06F 12/0804 | (2016.01) |

(52) U.S. Cl.
CPC .......... *G06F 12/0888* (2013.01); *G06F 12/08* (2013.01); *G06F 12/0804* (2013.01); *G06F 12/0866* (2013.01); *G06F 12/0886* (2013.01); *G06F 16/128* (2019.01); *G06F 16/172* (2019.01); *G06F 2212/60* (2013.01)

(58) Field of Classification Search
CPC ... G05F 12/0888; G06F 12/0888; G06F 12/08
USPC ....................................................... 711/138
See application file for complete search history.

(56) References Cited

U.S. PATENT DOCUMENTS

| | | | | |
|---|---|---|---|---|
| 2008/0104329 | A1* | 5/2008 | Gaither | G06F 12/0888 |
| | | | | 711/138 |
| 2011/0040906 | A1* | 2/2011 | Chung | G06F 5/16 |
| | | | | 710/57 |
| 2011/0119228 | A1* | 5/2011 | Menze | G06F 12/0888 |
| | | | | 707/607 |
| 2014/0181414 | A1* | 6/2014 | Eckert | G06F 12/0808 |
| | | | | 711/135 |
| 2017/0206166 | A1* | 7/2017 | Kumar | G06F 12/0888 |

\* cited by examiner

*Primary Examiner* — Gautam Sain
(74) *Attorney, Agent, or Firm* — Brian J. Colandreo; Mark H. Whittenberger; Holland & Knight LLP

(57) ABSTRACT

Embodiments of the present disclosure generally relate to a method and device for managing caches. In particular, the method may include in response to receiving a request to write data to the cache, determining the amount of data to be written. The method may further include in response to the amount of the data exceeding a threshold amount, skipping writing data to the cache and writing the data to a lower level storage of the cache. Corresponding systems, apparatus and computer program products are also provided.

17 Claims, 5 Drawing Sheets

METHOD AND DEVICE FOR MANAGING CACHES

RELATED APPLICATIONS

This application claim priority from Chinese Patent Application Number CN201610848648.3, filed on Sep. 23, 2016 at the State Intellectual Property Office, China, titled "METHOD AND DEVICE FOR MANAGING CACHES" the contents of which is herein incorporated by reference in its entirety.

FIELD

Embodiments of the present disclosure generally relate to the field of computers, and in particular to a method and device for managing caches.

BACKGROUND

During the development of computer technology, the access speed of a main memory has always been much slower than the processing speed of a central processing unit CPU. Consequently, high-speed processing capacity of the CPU cannot be fully exploited, adversely affecting the working efficiency of the entire computer system. In order to alleviate the mismatching between the processing speed of the CPU and the access speed of the main memory, one of the commonly used approaches is to adopt a cache memory in the storage hierarchy. A cache memory is a single-level memory existing between the main memory and the CPU, which has a relatively small capacity but an access speed much higher than the access speed of the main memory, being close to the processing speed of the CPU.

However, in current practical applications, in spite of a cache memory provided between the main memory and the CPU, there is still a problem that the system performance is seriously degraded when a large number of I/O operations are performed on the cache memory. For example, when a large number of I/O write operations are performed on the cache memory, all the data is usually written into the cache memory, regardless of the amount of data being written. When the amount of data being written to the cache memory is large (for example, greater than 250 K), the cache memory tends to be fully written since the capacity thereof is relatively small, resulting in a serious drop of the overall system performance.

SUMMARY

Embodiments of the present disclosure provide a method, a system and a computer program product for managing a cache.

According to a first aspect of the present disclosure, a method for managing a cache is provided. The method comprises: in response to receiving a request for writing data to the cache, determining the amount of data to be written. The method may further comprise: in response to the amount of data exceeding a threshold amount, skipping writing the data to the cache and writing the data to a lower level storage of the cache.

In one example embodiment, wherein skipping writing the data to the cache may comprise: determining a usage status of at least one of the cache and the lower level storage, and in response to the usage status satisfying a predetermined condition, skipping writing the data to the cache.

In one example embodiment, wherein determining the usage status of the cache may comprise: determining a usage ratio of the cache, and wherein skipping writing the data to the cache may comprise: in response to the usage ratio exceeding a threshold value, skipping writing the data to the cache.

In one example embodiment, wherein determining the usage status of the cache may comprise: determining a status of a snapshot of a file system stored in the cache; and wherein skipping writing the data to the cache may comprise: in response to that there is no uncompleted snapshot of the file system in the cache prior to writing the data to the cache, skipping writing the data to the cache.

In one example embodiment, wherein determining the usage status of the cache may comprise determining a usage status of addresses in the cache, and wherein skipping writing the data to the cache may comprise: in response to a destination address for writing the data to the cache and all addresses already used in the cache being non-overlapping, skipping writing the data to the cache.

In one example embodiment, wherein determining the usage status of the cache may comprise: determining the usage ratio of the common block file system; and wherein skipping writing the data to the cache may comprise: in response to the usage ratio common block file system being less than a threshold value, skipping writing the data to the cache.

In one example embodiment, wherein determining the usage status of the lower level storage may comprise: determining a usage ratio of a multi-core cache; and wherein skipping writing the data to the cache may comprise: in response to the usage ratio being less than a threshold value, skipping writing the data to the cache.

According to a second aspect of the present disclosure, a system for managing a cache is provided. The system comprises: processor and memory. The memory is coupled to the processor and stores instructions for execution by the processor. The instructions, when being executed by the processor, may cause the system to: in response to receiving a request for writing data to the cache, determine an amount of data to be written; in response to the amount of data exceeding a threshold amount, skip writing the data to the cache and write the data to a lower level storage of the cache.

According to a third aspect of the present disclosure, a computer program product is provided. The computer program product is tangibly stored on a non-transient computer-readable medium and comprises machine-executable instructions. The machine-executable instructions, when being executed, cause the machine to carry out acts of the method according to the first aspect of the present disclosure.

This Summary is provided to introduce a selection of concepts in a simplified form that are further described below in the Detailed Description. This Summary is not intended to identify key features or essential features of the present disclosure, nor is it intended to limit the scope of the present disclosure.

BRIEF DESCRIPTION OF THE DRAWINGS

Through the following detailed description of example embodiments of the present disclosure with reference to the accompanying drawings, the above and other objectives, features, and advantages of the present disclosure will become more apparent. In the example embodiments of the present disclosure, like reference numerals usually indicate similar elements.

DETAILED DESCRIPTION OF EMBODIMENTS

Preferred embodiments of the present disclosure will be described in more detail below with reference to the accompanying drawings. Although the preferred embodiments of the present disclosure are shown in the accompanying drawings, it is to be understood that the present disclosure may be implemented in various forms and should not be limited by the embodiments set forth herein. On the contrary, these embodiments are provided to make the disclosure more thorough and complete, and to fully convey the scope of the disclosure to those skilled in the art.

As used herein, the term "comprise" and its variants are to be read as open-ended terms that mean "including but not limited to". Unless otherwise stated, the term "or" is to be read as "and/or". The term "based on" is to be read as "at least partially based on". The terms "an example embodiment" and "an embodiment" are to be read as "at least one example embodiment". The term "another embodiment" is to be read as "at least one further embodiment". The terms "first", "second" and the like may refer to different or same objects. Other explicit and implicit definitions may be also included hereafter.

As described above, a series of problems (for example, a serious degradation of the system performance) may occur as a large number of I/O operations are performed on the cache memory. For the purpose of at least partially addressing one or more of the above-mentioned problems and other potential problems, example embodiments of the present disclosure propose a method and device for managing a cache. According to the present disclosure, when a large number of I/O operations are performed on the cache memory, it is judged whether the amount of data to be written exceeds a threshold amount. Additionally or alternatively, where it is determined that the amount of data to be written exceeds the threshold amount, it is further judged whether other predetermined conditions are satisfied, and based on the result of the judgments, it is determined whether writing to the cache is skipped. This provides a management scheme for the cache, by which the system performance is effectively improved.

Figure 1:
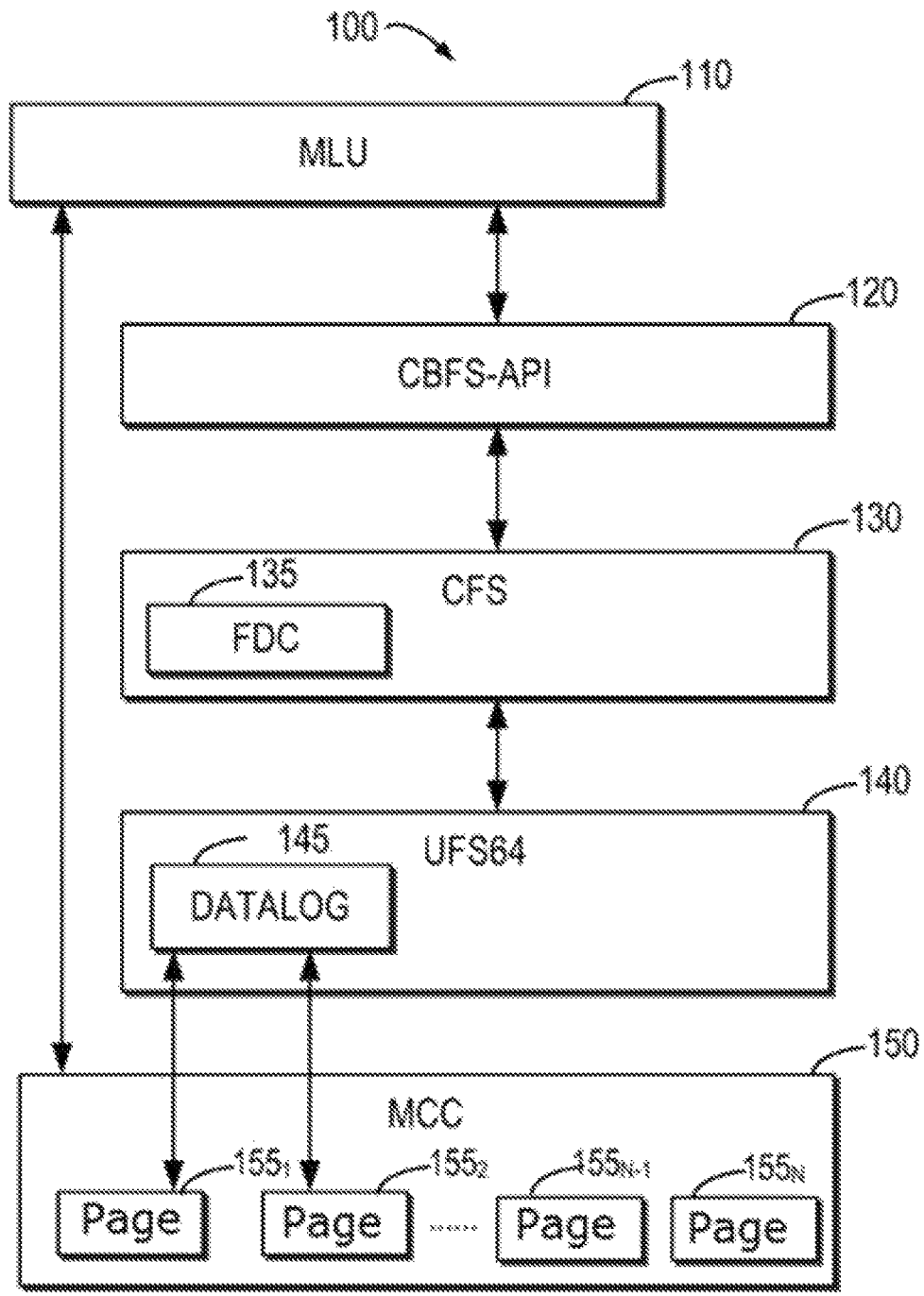
FIG. 1 illustrates a block diagram of a system 100 for managing a cache according to an embodiment of the present disclosure.

FIG. 1 illustrates a block diagram of a system 100 for managing a cache according to an embodiment of the present disclosure. It is to be understood that, the structure and function of the system 100 are described solely for illustrative purposes, but not implying any limitation to the scope of the present disclosure. Embodiments of the present disclosure may be embodied in different structures and/or functions.

As shown in FIG. 1, the system 100 may include a mapping logic unit (MLU) 110, a common block file system-application program interface (CBFS-API) 120, a common file system (CFS) 130, a unified file system (UFS64) 140 and a multi-core cache (MCC) 150. In addition, the common file system 130 may further include a file data cache (FDC) 135, the unified file system 140 may further include data log (DATALOG) 145, and the multi-core cache 150 may further include pages $155_1$, $155_2$ ... $155_{N-1}$, $155_N$ (collectively referred to as "page" 155), where N is a natural number. Furthermore, the mapping logic unit 110 may communicate with the common block file system-application program interface 120 and the multi-core cache 150, the common block file system-application program interface 120 may communicate with the common file system 130, the common file system 130 may communicate with the unified file system 140, and the data log 145 in the unified file system 140 may communicate with the page 155 in the multi-core cache 150. It is to be noted that, the specific names and/or protocols of the various components in the systems described herein are merely intended to assist those skilled in the art in better understanding the ideas of the present disclosure and are not intended to limit the scope of the disclosure in any way. Moreover, in other embodiments, more or better components may be included, and alternative components having the same or similar functionality may also be included.

For convenience of explanation, the file data cache 135 and the data log 145 may constitute a permanent file data cache (PFDC) as the "cache" as used herein, since the storage medium for storing the data log 145 has the characteristic of not losing data upon power-down, which can further improve the stability of the file system. It is to be noted that, the "cache" as used herein may also refer to the concept of caching well known in the art. In addition, the multi-core cache 150 may be used as "the lower level storage" as used herein, and the common block file system-application program interface 120, the common file system 130, and the unified file system 140 may constitute a common block file system (CBFS).

Specifically, according to embodiments of the present disclosure, in response to receiving a request, by the common block file system, from the mapping logic unit 110 for writing data to the cache, the amount of data to be written into the data log 145 in the cache is determined. In response to the amount of data exceeding the threshold amount, writing data to the data log 145 in the cache is skipped and the data is written to the lower level storage of the cache (i.e., the multi-core cache 150 in FIG. 1). Additionally or alternatively, in the case where the amount of data to be written to the data record 145 in the cache exceeds the threshold amount, it can be further judged whether other predetermined conditions are satisfied, and based on the result of judgment, it is determined whether writing to the data log 145 in the cache is skipped. For example, other predetermined conditions may be the usage ratio of the data log 145 in the current cache, the status of the snapshot of the file system stored in the file data cache 135 in the cache, the usage status of the address of the data log 145 in the current cache, the usage ratio of the common block file system for managing the cache, and the usage ratio of the multi-core cache 150 as the lower level storage. It is to be understood that, the example conditions described herein are merely for the purpose of assisting those skilled in the art in better understanding the ideas of the present disclosure and are not intended to limit the scope of the disclosure in any way. Moreover, in other embodiments, more or better predetermined conditions may be included.

Figure 2:
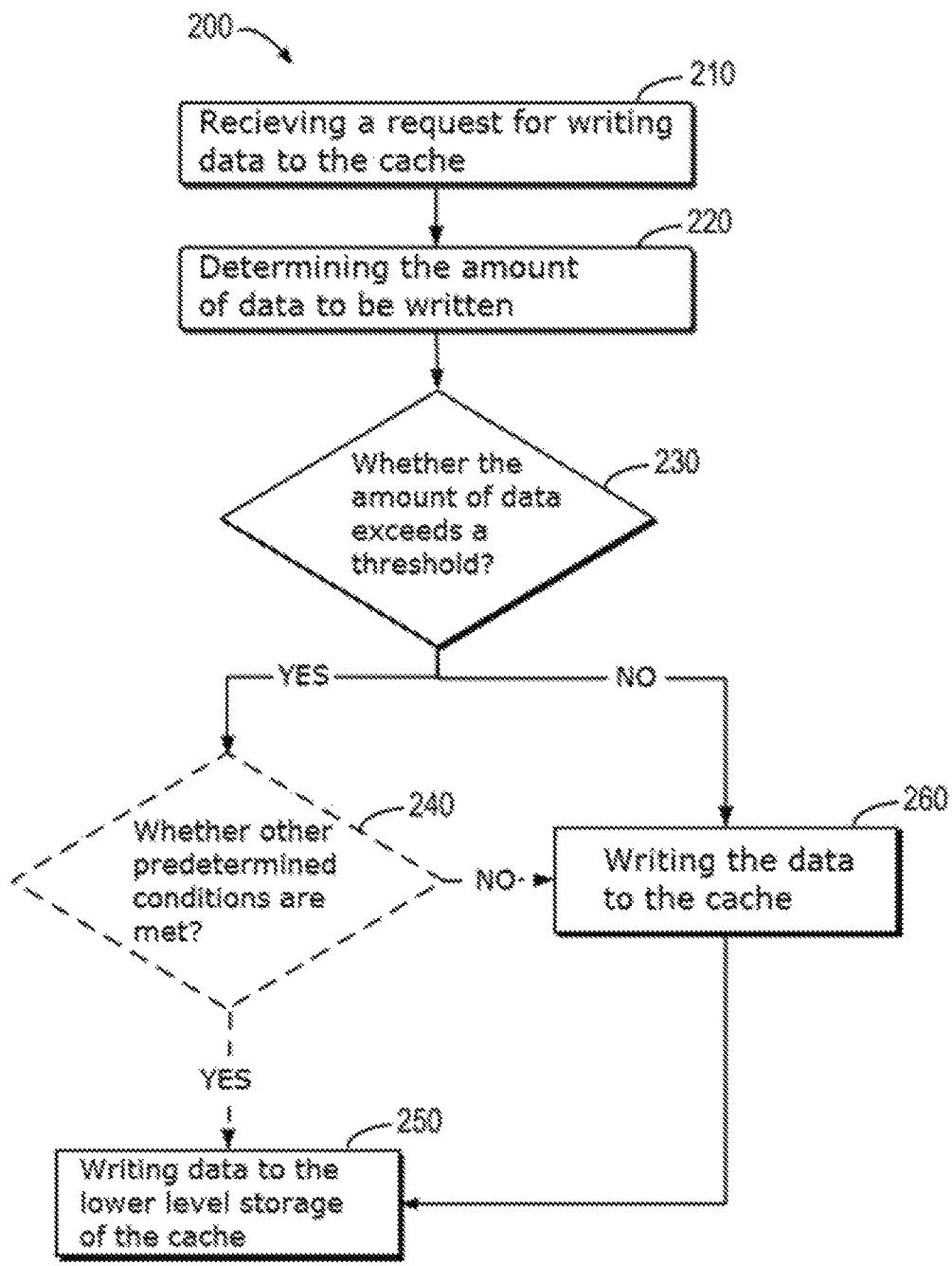
FIG. 2 illustrates a flow diagram of an example method 200 for managing a cache according to an embodiment of the present disclosure.

Example embodiments of the present disclosure will be described below in more details with reference to FIGS. 2 to 5. FIG. 2 illustrates a flow diagram of an example method 200 for managing a cache according to an embodiment of the present disclosure. For example, the method 200 may be performed by a system 100 for managing the cache as shown in FIG. 1. It is to be understood that, the method 200 may further include additional blocks not shown and/or may omit the illustrated blocks, to which the scope of the present disclosure is not limited.

As shown in FIG. 2, at 210, a request for writing data to the cache is received. In one embodiment, this may be achieved by means of a common block file system. For example, a request from the mapping logic unit 110 for writing data to the data log 145 in the cache is received by the common block file system. At 220, the amount of data to be written is determined. In one embodiment, this may also be achieved by means of a common block file system.

At 230, the amount of data determined to be written to the data log 145 in the cache is compared with a threshold amount (e.g., 250 KB, which is statistically obtained and can also be customized by the user) to determine whether the amount of data to be written exceeds the threshold amount. In response to the amount of data to be written exceeding the threshold amount, writing the data to the data log 145 in the cache is skipped. Otherwise, the data is written to the cache at 260, i.e., the data is written to the data log 145 in the cache.

It is to be understood that, in the above-described embodiment, writing to the cache is skipped as long as the amount of data to be written is sufficiently large (i.e., exceeding the threshold amount). Alternatively, in other embodiments, where the amount of data to be written exceeds the threshold amount, it is further judged at 240 whether other predetermined condition is satisfied, and based on the result of the judgment, it is determined whether writing to the cache is skipped. Generally, these conditions may relate to at least one of the usage ratio of the data log 145 in the current cache, the status of the snapshot of the file system stored in the file data cache 135 in the cache, the usage status of the address of the data log 145 in the current cache, the usage ratio of the common block file system for managing the cache, and the usage ratio of the multi-core cache 150 as the lower level storage, some of which will be described below.

In one embodiment, the conditions determined at 240 may include determining the usage ratio of the data log 145 in the cache, where the usage ratio may reflect the space currently occupied in the data log 145. For example, in response to determining that the usage ratio of the data log 145 in the cache is greater than 80% (this parameter can be statistically obtained and can also be customized by the user), that is, 80% of the space in the data log 145 in the cache being currently occupied, writing data to the data log 145 in the cache is skipped.

In one embodiment, the conditions to be determined at block 240 may include determining the status of the snapshot of the file system stored in the file data cache 135 in the cache. For example, the status of the snapshot of the file system stored in the file data cache 135 is detected before writing the data to the data log 145 in the cache. In response to determining that there is no uncompleted snapshot of the file system in the file data cache 135, writing data to the data log 145 in the cache is skipped.

In one embodiment, the conditions to be determined at block 240 may include determining the usage status of addresses in the data log 145 in the cache. For example, in response to determining that there is no overlapping between the destination address for writing data in the data log 145 in the cache and all addresses already occupied in the data log 145, writing data to the data log 145 in the cache is skipped.

In one embodiment, the conditions to be determined at block 240 may include determining the usage ratio of the common block file system, wherein the usage ratio may reflect the current busy level of the common block file system. For example, in response to the determining that the usage ratio of the common block file system is less than 80% (which can be statistically obtained and can also be customized by the user), that is, the common block file system being idle currently, writing data to the data log 145 in the cache is skipped.

In one embodiment, the conditions to be determined at 240 may include determining the usage ratio of the multi-core cache 150 as the lower level storage, wherein the usage ratio may reflect the currently used space in the multi-core cache 150. For example, in response to determining that the usage ratio of the multi-core cache 150 is less than 90% (which can be statistically obtained and can also be customized by the user), that is, there still being space available for storage in the multi-core cache 150, writing data to the data log 145 in the cache is skipped.

It is to be noted that, these conditions can be used alone or in combination. For example, in one embodiment, writing to the data log 145 in the cache is skipped only when all of the above conditions are met.

Turning to FIG. 2 again, at 240, in response to other predetermined conditions not being satisfied, the data is written to the lower level storage (in this example, the multi-core cache 150) of the cache at 250. In addition, after writing data to the cache at 260, the data is written to the lower level storage of the cache at appropriate time.

Figure 3:
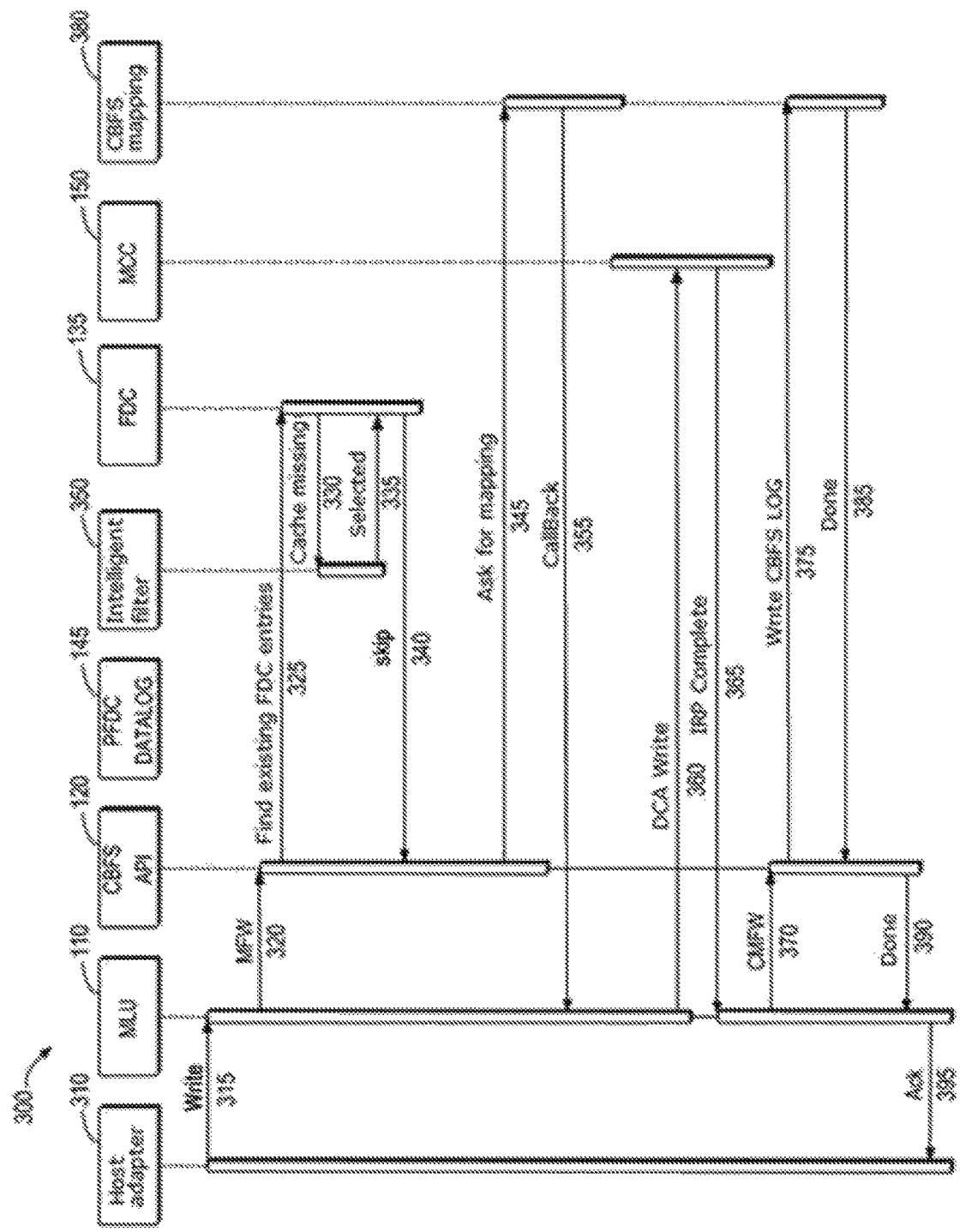
FIG. 3 illustrates an example 300 for managing a cache according to an embodiment of the present disclosure.

The method 200 for managing a cache according to an embodiment of the present disclosure has been described in detail above with reference to FIG. 2. Referring now to FIG. 3, an example 300 for managing a cache according to an embodiment of the present disclosure is shown therein. It will be appreciated that, the process described in connection with FIG. 3 may be considered as a specific embodiment of the method 200 described above. The description in conjunction with FIG. 3 is provided for the purpose of assisting those skilled in the art in better understanding the spirit and principles of the disclosed embodiments and is not intended to limit the scope of the disclosure in any way.

In the embodiment shown in FIG. 3, the user may operate (e.g., I/O operations on a computer file system) on a computer (e.g., a host and/or a server) through a host adapter 310 other than the system 100. For example, during an I/O write operation, the host adapter 310 sends (315) a write request to the mapping logic unit 110, which may be, for example, a request for writing data to the data log 145 in the cache.

The mapping logic unit 110 sends (320) a mapping-for-write (MFW) request to the common block file system-application program interface 120, in response to receiving a write request. In response to receiving the request for the mapping-for-write, it is required for the common block file system-application program interface 120 to send (325) a request to the file data cache 135 for finding the currently existing file data cache (FDC) entries, for the purpose of detecting whether there is an uncompleted snapshot of the file system in the file data cache in the cache.

If there is no existing file data cache entry being found in the file data cache 135 (i.e., missing, in other words, there being no uncompleted snapshot of the file system present in the file data cache 135), an indicator of cache missing is sent (330) to an intelligent filter 350, wherein the intelligent filter 350 is an abstract function module (not shown in FIG. 1) for the purpose of better illustrating how the common block file system manages the cache consisting of a file data cache and a data log.

It is to be noted that, the intelligent filter 350 is provided merely for assisting a person skilled in the art in better understanding the ideas of the present disclosure and is not intended to limit the scope of the present disclosure in any way. Moreover, in other embodiments, more or better components may be included, and alternative components having the same or similar functionality may also be included.

Suppose that the intelligent filter 350 judges that writing to the data log 145 in the cache should be skipped in accordance with the predetermined conditions described above, a selection of skipping writing to the data log 145 in the cache is sent (335) to the file data cache 135, which consequently sends (340) a skipping request to the common block file system-application program interface 120, thereby skipping writing data to the data log 145 in the cache. Next, the common block file system-application program interface 120 sends (345) a request for mapping to the common block file system mapping 380, wherein the common block file system mapping 380 outside the system 100 is used for mapping an I/O write operation, and is not shown in the system 100 of FIG. 1 in case of obscuring the present disclosure.

Next, the common block file system mapping 380 sends (355) a callback request to the mapping logic unit 110, so that the mapping logic unit 110 sends (360) a request for data copy avoidance (DCA) write (also referred to as a straight write) to the multi-core cache 150, for the purpose of writing data to the multi-core cache 150 as the lower level storage. Upon the completion of writing data to the multi-core cache 150, the multi-core cache 150 sends (365) an I/O request packet (IRP) completion to the mapping logic unit 110 to inform the mapping logic unit 110 that writing data to the multi-core cache 150 has been completed.

The mapping logic unit 110 sends (370) a request for processing the mapping for write (CMFW) to the common block file system-application program interface 120 to inform the common block file system-application program interface 120 on how to map the write. The common block file system-application program interface 120 sends (375) a request for writing a common block file system log (CBFS LOG) to the common block file system mapping 380.

After the common block file system mapping 380 completed writing the common block file system log, a completion notification is sent (385) to common block file system-application program interface 120 to inform the common block file system-application program interface 120 that writing the common block file system log is completed. Next, the common block file system-application program interface 120 sends (390) a completion notification to the mapping logic unit 110, which then sends (395) a acknowledge notification to the host adapter 310.

Figure 4:
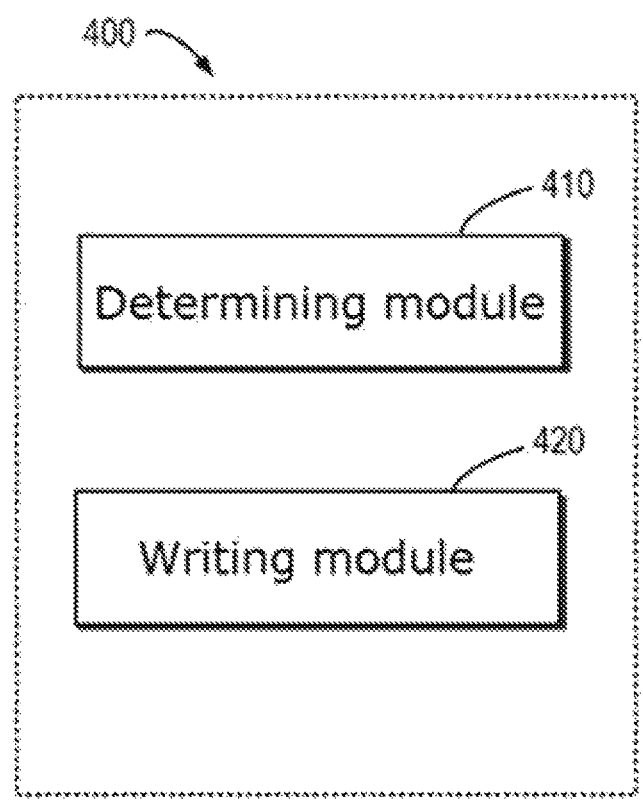
FIG. 4 illustrates a block diagram of an apparatus 400 for managing a cache according to an embodiment of the present disclosure.

FIG. 4 illustrates a block diagram of an apparatus 400 for managing a cache according to an embodiment of the present disclosure. For example, the method 200 for managing the cache may be implemented by the apparatus 400. As shown in FIG. 4, the apparatus 400 may include a determination module 410 configured to in response to receiving a request for writing data to the cache, determine the amount of data to be written. The apparatus 400 may further include a write module 420 configured to in response to the amount of data exceeding a threshold amount, skip writing the data to the cache and write the data to the lower level storage of the cache.

For the purposes of clarity, some of the optional modules of the apparatus 400 are not shown in FIG. 4. However, it is to be understood that, various features described above with reference to FIGS. 1 to 3 are also applicable to the apparatus 400. Furthermore, various modules of the apparatus 400 may be either hardware modules or software modules. For example, in some embodiments, the apparatus 400 may be implemented partially or wholly using software and/or firmware, such as a computer program product embodied on a computer-readable medium. Alternatively or additionally, the apparatus 400 may be implemented partially or wholly based on hardware, for example, being implemented as an integrated circuit (IC), an application specific integrated circuit (ASIC), a system on chip (SOC), a field programmable gate array (FPGA), and the like. The scope of the present disclosure is not limited thereto.

Figure 5:
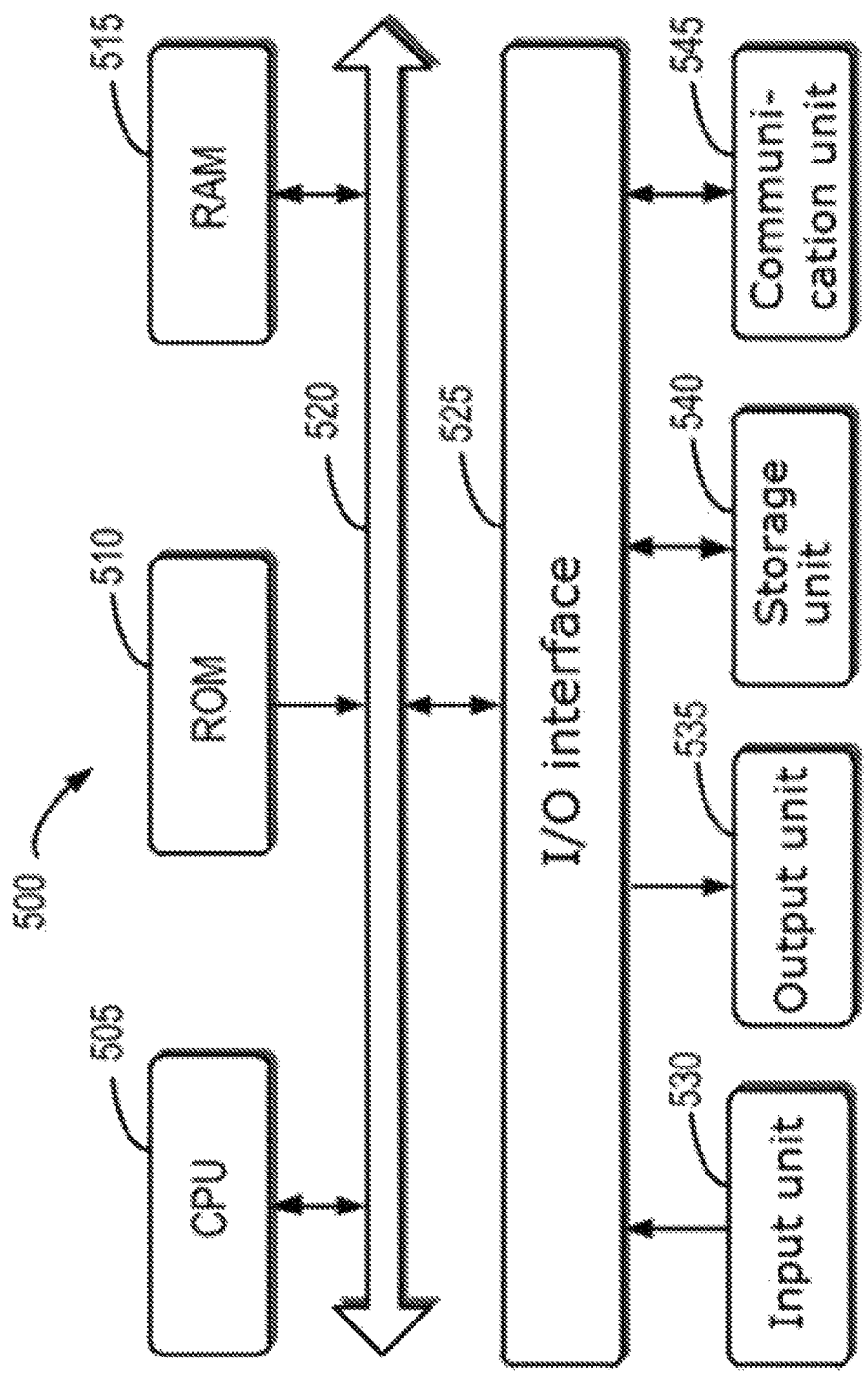
FIG. 5 illustrates a schematic block diagram of an example device 500 that may be used to implement embodiments of the present disclosure.

FIG. 5 illustrates a schematic block diagram of an example device 500 that may be used to implement embodiments of the present disclosure. As shown, the device 500 includes a central processing unit (CPU) 505, which may perform various appropriate actions and processes according to computer program instructions stored in a read-only memory (ROM) 510 or computer program instructions loaded from a storage unit 540 into a random access memory (RAM) 515. In the RAM 515, various programs and data required for operating the device 500 can also be stored. The CPU 505, the ROM 510, and the RAM 515 are connected to each other via a bus 520. The input/output (I/O) interface 525 is also connected to the bus 520.

A plurality of components in the device 500 are connected to an I/O interface 525, including an input unit 530, such as a keyboard, a mouse, and the like; an output unit 535, such as various types of displays, speakers, and the like; a storage unit 540, such as a disk, an optical disk and the like; and a communication unit 545, such as a network card, a modem, a wireless communication transceiver, and the like. The communication unit 545 enables the device 500 to exchange information/data with other devices via a computer network such as the Internet and/or various telecommunication networks.

The various procedures and processes described above, for example the example method 200, may be performed by the central processing unit 505. For example, in some embodiments, the example method 200 may be implemented as a computer software program that is tangibly embodied in a machine-readable medium, such as a storage unit 540. In some embodiments, part or all of the computer programs may be loaded and/or mounted on the device 500 via the ROM 510 and/or the communication unit 545. When the computer program is loaded into the RAM 515 and executed by the CPU 505, one or more acts of the example method 200 and/or the example 300 described above may be performed. Alternatively, in other embodiments, the central processing unit 505 may also be configured in any other suitable manner (e.g., as a firmware) to implement the procedure/method described above.

As can be seen from the above description, the embodiments of the present disclosure significantly and efficiently improve the performance of the I/O processor by skipping writing data to the cache when the amount of data to be written is greater than the threshold amount, especially in the case where large sequential writes or complex mixed writes (including large sequential writes and small random writes) are performed on the cache.

The present disclosure may be a method, an apparatus, a system, and/or a computer program product. The computer program product may include a computer-readable storage medium onto which computer-readable program instructions for performing various aspects of the present disclosure are loaded.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Drawings illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It is also to be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skilled in the art to understand the embodiments disclosed herein.

We claim:

1. A method for managing a cache, comprising:
in response to receiving a request for writing data to a data log in the cache, determining an amount of data to be written, wherein determining the amount of data includes comparing the amount of data to a threshold amount;
in response to the amount of data exceeding the threshold amount and satisfying a predetermined condition,
not writing the data to the data log in the cache, and
writing the data to a lower level storage of the cache,
wherein the predetermined condition comprises determining a usage status of at least one of the data log in the cache and the lower level storage of the cache, wherein determining the usage status of the data log in the cache comprises determining a usage ratio of a common block file system;
in response to receiving a request for writing data to the data log in the cache, sending a mapping-for-write request to the common block file system;
in response to receiving the mapping-for-write request, sending a callback request from the common block file system to a mapping logic unit, wherein in response to sending the callback request, sending a request from the mapping logic unit to the lower level storage of the cache for writing the data to the lower level storage of the cache; and
sending, from the lower level storage of the cache, an Input/Output (I/O) request packet (IRP) completion to the mapping logic unit.

2. The method of claim 1, wherein determining the usage status of the cache comprises determining a usage ratio of the cache, and in response to the usage ratio exceeding a threshold value, not writing the data to the cache.

3. The method of claim 1, wherein determining the usage status of the cache comprises determining a status of a snapshot of a file system stored in the cache, and in response to there being a complete snapshot of the file system in the cache prior to writing the data to the cache, not writing the data to the cache.

4. The method of claim 1, wherein determining the usage status of the cache comprises determining a usage status of addresses in the cache, and in response to a destination address for writing the data to the cache and all addresses already used in the cache being separate, not writing the data to the cache.

5. The method of claim 1, wherein determining the usage ratio of the common block file system comprises: in response to the usage ratio common block file system being less than a threshold value, not writing the data to the cache.

6. The method of claim 1, wherein determining the usage status of the lower level storage comprises determining a usage ratio of a multi-core cache, and in response to the usage ratio of the multi-core cache being less than a threshold value, not writing the data to the cache.

7. A system for managing a cache, comprising:
processor;
memory coupled to the processor and storing instructions for execution by the processor, the instructions, when being executed by the processor, cause the system to:
in response to receiving a request for writing data to a data log in the cache, determine an amount of data to be written, wherein determining the amount of data includes comparing the amount of data to a threshold amount;
in response to the amount of data exceeding the threshold amount and satisfying a predetermined condition,
not writing the data to the data log in the cache, and
write the data to a lower level storage of the cache,
wherein the predetermined condition comprises determining a usage status of at least one of the data log in the cache and the lower level storage of the cache, wherein determining the usage status of the data log in the cache comprises determining a usage ratio of a common block file system;
in response to receiving a request for writing data to the data log in the cache, send a mapping-for-write request to the common block file system;
in response to receiving the mapping-for-write request, sending a callback request from the common block file system to a mapping logic unit, wherein in response to sending the callback request, sending a request from the mapping logic unit to the lower level storage of the cache for writing the data to the lower level storage of the cache; and
sending, from the lower level storage of the cache, an Input/Output (I/O) request packet (IRP) completion to the mapping logic unit.

8. The system of claim 7, wherein determining the usage status of the cache comprises determining a usage ratio of the cache, and in response to the usage ratio exceeding a threshold value, not writing the data to the cache.

9. The system of claim 7, wherein determining the usage status of the cache comprises determining a status of a snapshot of a file system stored in the cache, and in response to there being a complete snapshot of the file system in the cache prior to writing the data to the cache, not writing the data to the cache.

10. The system of claim 7, wherein determining the usage status of the cache comprises determining a usage status of addresses in the cache, and in response to a destination address for writing the data to the cache and all addresses already used in the cache being separate, not writing the data to the cache.

11. The system of claim 7, wherein determining the usage ratio of the common block file system comprises: in response to the usage ratio common block file system being less than a threshold value, not writing the data to the cache.

12. The system of claim 7, wherein determining the usage status of the lower level storage comprises determining a usage ratio of a multi-core cache, and in response to the usage ratio of the multi-core cache being less than a threshold value, not writing the data to the cache.

13. A computer program product for managing a cache, the computer program product comprising:
a non-transitory computer readable medium encoded with computer-executable program code for managing cache, wherein the code enables execution across one or more processors for:
in response to receiving a request for writing data to a data log in the cache, determining an amount of data to be written, wherein determining the amount of data includes comparing the amount of data to a threshold amount;
in response to the amount of data exceeding the threshold amount and satisfying a predetermined condition, not writing the data to the data log in the cache, and writing the data to a lower level storage of the cache, wherein the predetermined condition comprises determining a usage status of at least one of the data log in the cache and the lower level storage of the cache, wherein determining the usage status of the data log in the cache comprises determining a usage ratio of a common block file system;

in response to receiving a request for writing data to the data log in the cache, sending a mapping-for-write request to the common block file system;

in response to receiving the mapping-for-write request, sending a callback request from the common block file system to a mapping logic unit, wherein in response to sending the callback request, sending a request from the mapping logic unit to the lower level storage of the cache for writing the data to the lower level storage of the cache; and sending, from the lower level storage of the cache, an Input/Output (I/O) request packet (IRP) completion to the mapping logic unit.

14. The computer program product of claim 13, wherein determining the usage status of the cache comprises determining a usage ratio of the cache, and in response to the usage ratio exceeding a threshold value, not writing the data to the cache.

15. The computer program product of claim 13, wherein determining the usage status of the cache comprises determining a status of a snapshot of a file system stored in the cache, and in response to there being a complete snapshot of the file system in the cache prior to writing the data to the cache, not writing the data to the cache.

16. The computer program product of claim 13, wherein determining the usage status of the cache comprises determining a usage status of addresses in the cache, and in response to a destination address for writing the data to the cache and all addresses already used in the cache being separate, not writing the data to the cache.

17. The computer program product of claim 13, wherein determining the usage ratio of the common block file system comprises: in response to the usage ratio common block file system being less than a threshold value, not writing the data to the cache.

* * * * *